United States Patent [19]
Eifert et al.

[11] Patent Number: 5,727,172
[45] Date of Patent: Mar. 10, 1998

[54] METHOD AND APPARATUS FOR PERFORMING ATOMIC ACCESSES IN A DATA PROCESSING SYSTEM

[75] Inventors: James B. Eifert, Austin, Tex.; Adi Sapir, Tel Aviv, Israel; Wallace B. Harwood, III, Austin, Tex.

[73] Assignee: Motorola, Inc., Schaumburg, Ill.

[21] Appl. No.: 431,943

[22] Filed: May 1, 1995

[51] Int. Cl.$^6$ .................................................. G06F 13/14
[52] U.S. Cl. ................. 395/290; 395/726; 364/240.5; 364/DIG. 1
[58] Field of Search .................................. 395/288, 290, 395/726, 837, 800; 364/240.5, DIG. 1

[56] References Cited

U.S. PATENT DOCUMENTS

| | | | |
|---|---|---|---|
| 5,453,737 | 9/1995 | Opoczynski | 340/825.03 |
| 5,506,971 | 4/1996 | Gullette et al. | 395/296 |
| 5,548,780 | 8/1996 | Krien | 395/825 |

OTHER PUBLICATIONS

Motorola, Inc.; "PowerPC™ 603 RISC Microprocessor User's Manual;" 1994; pp. 5–1 through 5–29, 4–70 through 4–73, 10–1 through 10–56, 11–108, and 11–180.

Motorola 1994, "PowerPC 603 RISC Microprocessor User's Manual", Chapter 4.10 Memory Synchronization Instructions, pp. 4–70 –4–73.

Motorola 1994, "PowerPC 603 RISC Microprocessor User's Manual",Chapter 10.9 Processor State Signals, pp. 10–53.

Motorola 1994, "MC88110 Second Generation RISC Microprocessor User's Manual", Chapter xmem Exchange Register With Memory, pp. 10–90 –10–91.

Motorola 1994,"MC88110 Second Generation RISC Microprocessor User's Manual", Chapter 11.3.3.1 Bus Snooping Flow For Transaction Without Intent–To–Modify, pp. 11–23 –11–24.

Motorola 1994,"MC88110 Second Generation RISC Microprocessor User's Manual", Chapter 11.5.3.6 xmem Transaction, pp. 11–53 –11–56.

*Primary Examiner*—John E. Harrity
*Attorney, Agent, or Firm*—Susan C. Hill

[57] ABSTRACT

A method and apparatus for performing atomic accesses in a data processing system (10). In one embodiment, a small number of control signals (e.g. 100–102; or 103–104; or 105–108 from FIG. 3 ) are used to provide information regarding the status of reservations between bus masters (e.g. 80), bus interfaces (e.g. 84, 86, and 92), and snoop logic (e.g. 82,88, and 90). Snoop logic (e.g. 40 in FIG. 2) is required if multiple bus masters (12 and 46) are used. The control signals allow atomic accesses to be performed in a multi-master data processing system (10), while minimizing the circuitry required to be built on-board each bus master integrated circuit processor (e.g. 152 in FIG. 3). The result is lower cost processors (152) which can operate in multi-processor systems, but which are optimized for use in single-processor systems.

31 Claims, 8 Drawing Sheets

STORAGE RESERVATION INTERFACE SIGNALS FOR L-BUS 94 (SEE FIG.3)

| SIGNAL NAME | SIGNAL DIRECTION | SIGNAL TIMING (WHEN SIGNAL CHANGES STATE) | SIGNAL IS QUALIFIED BY: | SIGNAL DESCRIPTION |
|---|---|---|---|---|
| LB_RESERV_B SIGNAL 100 | MASTER TO SLAVE | T3 | NORMAL ADDRESS PHASE TERMINATION | ADDRESS PHASE SIGNAL. INDICATES A LOAD/STORE WITH RESERVE. THIS SIGNAL IS DRIVEN ASSERTED ONLY BY THE CPU. |
| LB_KILL_RES_B SIGNAL 102 | SLAVE TO MASTER | T2 | NORMAL DATA PHASE TERMINATION | DATA PHASE SIGNAL. INDICATES THAT THE STORE CONDITIONAL (WITH RESERVATION) CYCLE HAS FAILED. RESERVATION HAS BEEN LOST PRIOR TO THE CYCLE ISSUE. |
| LB_CANCELR_B SIGNAL 101 | L-BUS SNOOP LOGIC 82 TO MASTER | T3 | NONE | THIS SIGNAL IS ASSOCIATED WITH ANOTHER MASTER ADDRESS PHASE. WHEN ASSERTED, THIS SIGNAL INDICATES THAT THE STORAGE RESERVATION HAS BEEN LOST DUE TO A WRITE CYCLE TO THE ADDRESS ON WHICH A STORAGE RESERVATION HAS BEEN SET BY ANOTHER MASTER. THE SIGNAL WILL BE ASSERTED ONLY FOR NON-CPU CYCLES. THE SNOOP LOGIC CAN DETERMINE THE BUS MASTER USING THE ARBITRATION SIGNALS. THE SIGNAL WILL BE ASSERTED ONLY IN CASE OF NORMAL ADDRESS PHASE TERMINATION (NO ADDRESS ERROR, AACK ASSERTED AND NO ABORT). |

| STORAGE RESERVATION INTERFACE SIGNALS FOR E-BUS 98 (SEE FIG.3) | | |
|---|---|---|
| SIGNAL NAME | SIGNAL DIRECTION | SIGNAL DESCRIPTION |
| CR_L SIGNAL 107 | E-BUS RESERVATION SNOOP LOGIC 90 TO SIU 86 | CANCEL RESERVATION. EACH POWER PC CPU HAS ITS OWN CR_L SIGNAL. WHEN ASSERTED THIS SIGNAL INSTRUCTS THE BUS MASTER TO CLEAR ITS RESERVATION BECAUSE SOME OTHER MASTER HAS TOUCHED ITS RESERVED SPACE. |
| ARETRY_L SIGNAL 108 | NON-LOCAL BUS INTERFACE 92 TO SIU 86 | ADDRESS RETRY. WHEN ASSERTED, THIS SIGNAL INDICATES THAT THE MASTER NEEDS TO RETRY ITS ADDRESS PHASE. IN CASE OF A STWCX CYCLE TO A NON-LOCAL BUS ON WHICH THE STORAGE RESERVATION HAS BEEN LOST, THIS SIGNAL IS USED BY THE NON-LOCAL BUS INTERFACE TO BACK-OFF THE CYCLE. |

*FIG. 7*

| STORAGE RESERVATION INTERFACE SIGNALS FOR IMB 96 (SEE FIG.3) | | |
|---|---|---|
| SIGNAL NAME | SIGNAL DIRECTION | SIGNAL DESCRIPTION |
| IMB_RESERV SIGNAL 103 | MASTER TO SLAVE | CURRENT READ/WRITE CYCLES IS OF RESERVE TYPE |
| IMB_RES_ACTIVE SIGNAL 104 | IMB RESERVATION AND SNOOP LOGIC 88 TO L/IMB BUS INTERFACE 84 | IMB RESERVATION ACTIVE |

| STORAGE RESERVATION INTERFACE SIGNALS FOR LOAD/STORE LOGIC 110 AND DATA CACHE 114 (SEE FIG.3 AND FIG.9) | | |
|---|---|---|
| SIGNAL NAME | SIGNAL DIRECTION | SIGNAL DESCRIPTION |
| DC_RESERV_B SIGNAL 117 | LOAD/STORE LOGIC 110 TO DATA CACHE 114 | CURRENT READ/WRITE CYCLES IS A LWARX OR STWCX CYCLE |
| DC_KILL_B SIGNAL 118 | DATA CACHE 114 TO LOAD/STORE LOGIC 110 | CURRENT READ/WRITE CYCLES IS OF RESERVE TYPE |
| IMB_RES_ACTIVE SIGNAL 104 | IMB RESERVATION AND SNOOP LOGIC 88 TO L/IMB BUS INTERFACE 84 | IMB RESERVATION ACTIVE |

FIG.10

METHOD AND APPARATUS FOR PERFORMING ATOMIC ACCESSES IN A DATA PROCESSING SYSTEM

FIELD OF THE INVENTION

The present invention relates to a data processing system, and more particularly to a method and apparatus for performing atomic accesses in a data processing system.

BACKGROUND OF THE INVENTION

As microprocessor systems become more and more complex, new techniques are required to ensure the efficient use of system resources. For example, in many multi-processor systems, there are several microprocessors trying to share some of the same system resources, such as memory storage, a printer, or a port to a display screen. It is crucial in such multi-processor systems that the communication pathways or busses carrying information between the microprocessors and the system resources are used in the most efficient way possible.

Microprocessors must arbitrate among themselves to determine which processor will win the arbitration and be in control of the bus. Only when a microprocessor has won arbitration and is thus the "bus master" can that microprocessor then send or receive invformation across the bus. Other microprocessors must wait their turn to become the bus master in order to send or receive information across the bus.

Aside from the need to efficiently utilize busses, the need also exists to efficiently share system resources, such as, for example, a portion of memory. In the PowerPC ™ family of data processors available from Motorola, Inc. of Austin, Tex. "reservations" are used to reserve a particular memory address space for a particular processor. (PowerPC is a trademark of International Business Machines Corp.)

In the PowerPC™ family of data processors, memory location "X" can be updated atomically by asserting a reservation bit during execution of a load operation to memory location "X", and by checking that the reservation bit is still asserted before a store operation to memory location "X" is performed. The assertion of the reservation bit and the load operation is performed during execution of the "LWARX" (Load Word and Reserve Indexed) instruction. The store operation is performed during execution of the "STWCX" (Store Word Conditional Indexed) instruction.

In the PowerPC™ family of data processors, the "LWARX" instruction sets up a reservation for a first processor which has executed the "LWARX" instruction. The "STWCX" instruction is then executed by the first processor in order to alter the data stored at the reserved memory location. If the reserved memory location has been written by another processor between the first processor's execution of the "LWARX" instruction and the "STWCX" instruction, then the "STWCX" instruction executed by the first processor does not alter the reserved memory location. By using the "LWARX" instruction and the "STWCX" instruction, processors are able to perform atomic accesses to memory locations.

To better understand the use of reservations in a data processing system, an example will be described. If multiple processors are sharing the same printer, there must be a way to indicate which processor is currently using the printer and whether that processor is performing a function that must not be disturbed. Semaphores, which may be implemented using reservations, are used for this function in many multi-processor systems.

Semaphores are a type of flag or status indicator that reflects the present status of a system resource. Usually the status information in a semaphore indicates whether or not the system resource is presently being used. In some multi-processor systems, the semaphore may also include information about which microprocessor is using the resource, and possibly even the type of function being performed on the resource.

For example, a particular location in memory can be designated as the location of the semaphore for a printer resource. If any processor wants to use the printer, that processor must read the printer semaphore by reading that particular location in memory. The printer semaphore contains information on the status of the printer, such as whether the printer is currently being used. If the printer semaphore indicates that the printer is currently being used and is thus busy, the processor must wait. The processor can continue to poll the printer semaphore by periodically reading the printer semaphore to see if the printer is still being used or if it has become available.

Once the printer semaphore indicates that the printer is available, the waiting processor writes to the printer semaphore to change its status to busy. The waiting processor has thus effectively locked the printer resource for its own use. No other processors can use the printer while the printer's semaphore indicates that the printer is being used. Once the waiting processor has finished using the printer, it writes a new value to the printer semaphore location in order to change the printer semaphore to indicate that the printer is once again available.

The purpose for the atomic memory updating provided by the "LWARX" and "STWCX" instructions is to ensure that only one processor at a time, the one with the reservation for the printer semaphore, is able to alter the printer semaphore to indicate that the printer is busy. The one processor with the reservation is thus the one processor which is permitted to use the printer. Because only the processor that currently has the reservation is permitted to use the printer, collisions on the bus going to the printer are avoided and the printer is able to correctly print out the information from one processor at a time.

Prior art multi-processor systems have implemented atomic memory updating in various ways. One implementation is to lock the bus during the entire time it takes for a processor to perform both a read and a subsequent write to a semaphore in memory. "Locking" the bus means that the present bus master is the only processor that is allowed to use the bus for multiple bus cycles. Normally, arbitration for the bus occurs frequently so that all processors have a chance to use the bus at regular intervals. Locking the bus is performed so that no other processor has a chance to become the bus master and use the bus.

A processor that has won the bus arbitration and has become the bus master locks the bus before reading a semaphore. Because the bus is locked, no other processors can use the bus. The bus master processor then reads the semaphore from memory and determines if the system resource is available. If the resource is busy, the bus master processor releases the bus lock, and arbitration for a new bus master can take place. But if the resource is available, the bus master processor continues to keep the bus locked until the bus master processor is able to write a new value to the semaphore indicating that the system resource is now busy.

By locking the bus, only one processor at a time is able to read a semaphore, see that the system resource is available, and write back a value to the semaphore to indicate that the resource is now busy. Thus, locking the bus guarantees that only one processor at a time will actually use a system resource. Collisions on the bus are therefore avoided.

However, locking the bus has a very significant drawback. It may cause communications between other microprocessors and system resources to slow down considerably. And as a result, the whole system may operate much more slowly.

As an example, a problem may arise when a hierarchical bus structure utilizing multiple busses is used. If the bus master processor and the memory containing the semaphore are on busses that are very distant from one another, the bus master must continuously lock all of the busses between itself and the distant memory during both the read and the subsequent write to the semaphore. This is not a very effective use of the bus time, especially considering that an access to a semaphore is usually a very common access in a multi-processor system. Thus, locking the bus is not a very satisfactory solution.

Another way in which prior art multi-processor systems have implemented atomic memory updating is by performing "snooping" to detect when atomicity has been violated. For example, in the PowerPc™ family of data processors, snooping is used to detect when a reservation has been violated. "Snooping" requires circuitry which monitors the flow of information being transferred across a bus. In the PowerPc™ family of data processors, each processor has on-board snoop circuitry. The snoop circuitry on-board a first processor determines whether or not a second processor has altered a memory location which was reserved by the first processor.

In addition, the snoop circuitry on-board each processor often includes cache coherency circuitry. The cache coherency circuitry on-board a first processor is used to ensure that the cache(s) of the first processor are properly updated (e.g. a cache line is invalidated) when certain memory locations are altered by other processors.

The PowerPC™ family of data processors is now being extended into the area of embedded controllers. Because many embedded controllers operate in single-master systems, it is important to reduce the cost of circuitry which is required only for multi-processor applications. A lower cost approach to performing atomic accesses was needed. In addition, at least one embodiment of the lower cost approach must maintain instruction set compatibility with the PowerPc™ family of data processors. Thus at least one embodiment must use the system of "reservations" as defined by the "LWARX" and "STWCX" instructions.

DESCRIPTION OF THE PREFERRED EMBODIMENTS

Instead of locking busses or requiring each bus master to have on-board snoop logic, the present invention utilizes a different approach to guarantee atomic accesses in a data processing system. The present invention uses control signals which are exchanged between the one or more bus masters and the one or more blocks of reservation circuitry. In one embodiment of the present invention, each bus interface between two busses has its own reservation circuitry. The reservation circuitry may be incorporated as part of the bus interface, or may be separate logic which is coupled to the bus interface. Also, the present invention does not require that the bus masters have snoop logic. Instead, each bus may have its own snoop logic; however, a bus only requires snoop logic if there is more than one bus master coupled directly to that same bus.

The present invention thus allows atomic accesses to be performed in a multi-master data processing system, while minimizing the circuitry required to be built on-board each bus master processor. As a result, lower cost processors can be designed which are optimized for use in single-processor systems. However, by utilizing the capabilities of the present invention, these lower cost processor can still be used effectively in multi-processor systems. Note that the present invention also allows some bus masters to reduce circuitry and/or integrated circuit pins by implementing fewer than all of the address bus signals, as on-chip snooping by these bus masters is not required.

In addition, at least one embodiment of the lower cost approach is required to maintain instruction set compatibility with the PowerPc™ family of data processors. Thus at least one embodiment must use the system of "reservations" as defined by the "LWARX" and "STWCX" instructions in the PowerPC™ family of data processors. Alternate embodiments of the present invention may not be instruction set compatible with the PowerPc™ family of data processors.

Description of the Block Diagrams

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The term "bus" will be used to refer to a plurality of signals which may be used to transfer one or more various types of information, such as data, addresses, control, or status. The symbol "%" preceding a number indicates that the number is represented in its binary or base two form.

Figure 1:
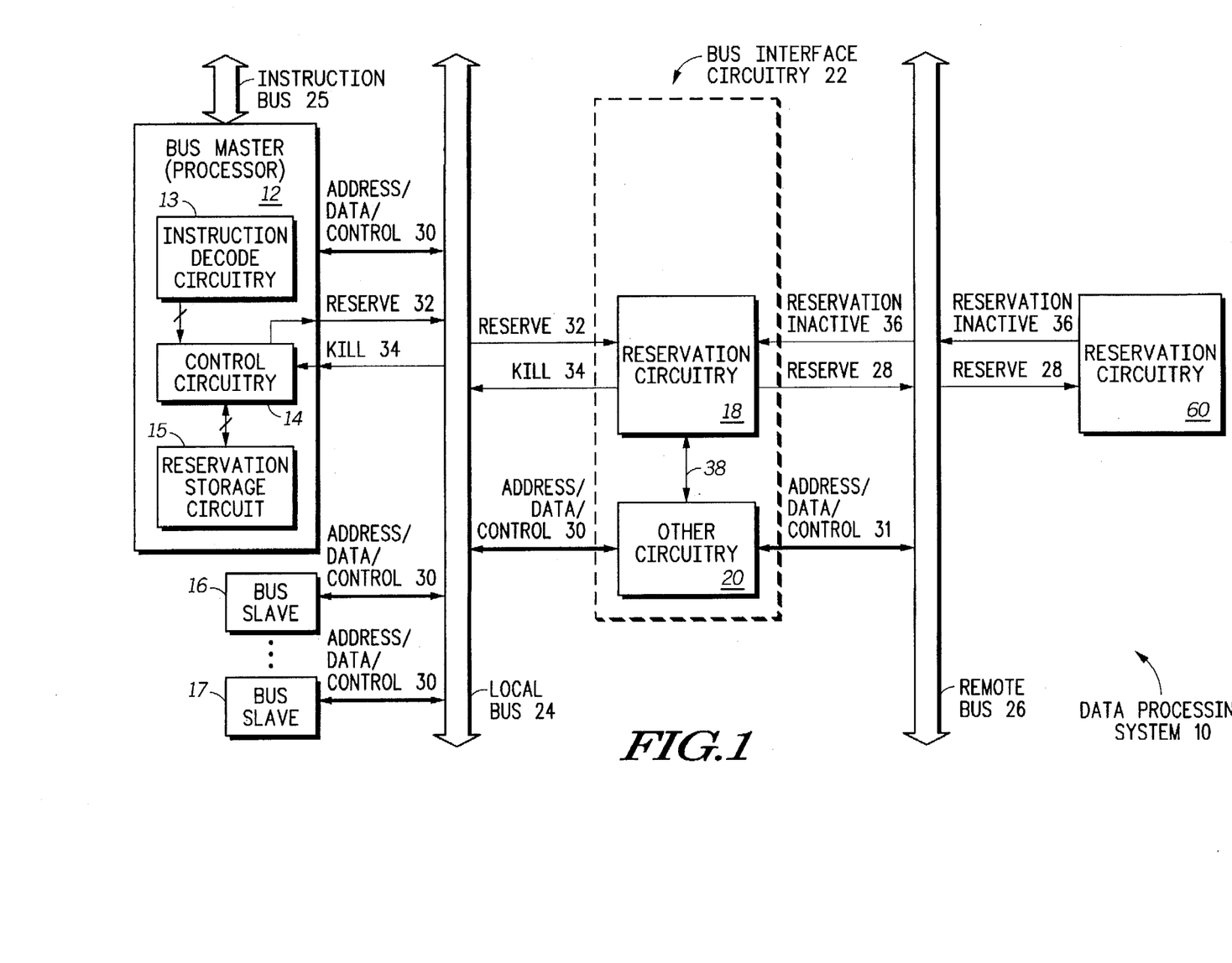
FIG. 1 illustrates, in block diagram form, a data processing system in accordance with one embodiment of the present invention.

FIG. 1 illustrates a data processing system 10 having a local bus 24 and a remote bus 26. A bus master 12 and a plurality of bus slaves 16, 17 are bi-directionally coupled to local bus 24 by way of address/data/control signals 30. The terms "local" and "remote" are from the perspective of bus master 12; bus master 12 is coupled more directly to local bus 24 and is coupled to remote bus 26 by way of bus interface circuitry 22. In one embodiment of the present invention bus master 12 is a processor, for example, a microprocessor or a microcontroller integrated circuit. In one embodiment of the present invention, bus master 12 receives data processor instructions by way of instruction bus 25.

Bus master 12 has instruction decode circuitry 13 which is used to decode instructions received from instruction bus 25. Instruction decode circuitry 13 then provides a plurality of signals to control circuitry 14. Control circuitry 14 is bi-directionally coupled to reservation storage circuit 15. Control circuitry 14 receives a kill signal 34 from local bus 24, and provides a reserve signal 32 to local bus 24. Note that in one embodiment of the present invention, the address/data/control signals 30, the reserve signal 32, and the kill signal 34 are all part of local bus 24. Local bus 24, remote bus 26, and instruction bus 25 each includes a plurality of conductors which are used to transfer the bus signals.

Local bus 24 is coupled to remote bus 26 by way of bus interface circuitry 22. In one embodiment of the present invention, bus interface circuitry 22 includes reservation circuitry 18 and other circuitry 20. Reservation circuitry 18 receives the reserve signal 32 from local bus 24, and reservation circuitry 18 provides the kill signal 34 to local bus 24. Also, reservation circuitry 18 receives the reservation inactive signal 36 from remote bus 26, and reservation circuitry 18 provides the reserve signal 28 to remote bus 26.

In alternate embodiments of the present invention, bus interface circuitry 22 may include only other circuitry 20 and may function in the same manner as prior art bus interfaces. In these embodiments, reservation circuitry 18 is not included as part of bus interface circuitry 22.

Other circuitry 20 is bi-directionally coupled to local bus 24 by way of address/data/control signals 30, is bi-directionally coupled to remote bus 26 by way of address/data/control signals 31, and is bi-directionally coupled to reservation circuitry 18 by way of signals 38. Reservation circuitry 60 provides the reservation inactive signal 36 to remote bus 26, and reservation circuitry 60 receives the reserve signal 28 from remote bus 26. Other bus slaves (not shown) and other bus masters (not shown) may be coupled directly to remote bus 26.

Figure 2:
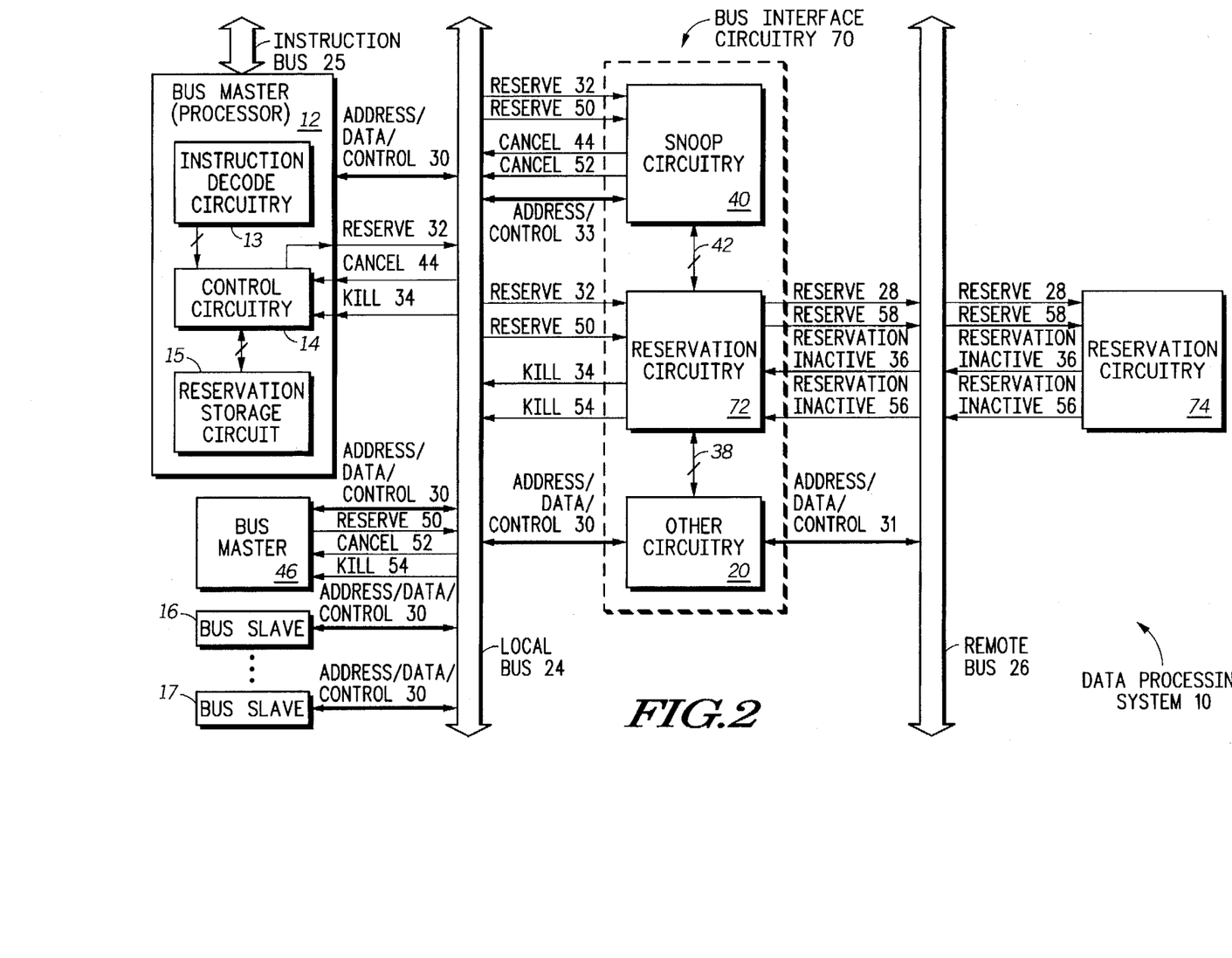
FIG. 2 illustrates, in block diagram form, a data processing system in accordance with an alternate embodiment of the present invention.

FIG. 2 illustrates a data processing system 10 in accordance with an alternate embodiment of the present invention. The same reference numerals are used for circuits and signals that may be the same in both FIG. 1 and FIG. 2. In FIG. 2, an additional bus master 46 is directly coupled to local bus 24. The other changes in FIG. 2 are a result of the additional bus master 46 coupled to local bus 24. Note that bus master 46 may be a data processor or may be a DMA circuit (i.e. a direct memory access circuit).

FIG. 2 illustrates a data processing system 10 having a local bus 24 and a remote bus 26. A bus master 12, a bus master 46, and a plurality of bus slaves 16, 17 are bi-directionally coupled to local bus 24 by way of address/data/control signals 30. The terms "local" and "remote" are from the perspective of bus master 12; bus master 12 is coupled more directly to local bus 24 and is coupled to remote bus 26 by way of bus interface circuitry 70. In one embodiment of the present invention bus master 12 is a processor, for example, a microprocessor or a microcontroller integrated circuit. In one embodiment of the present invention, bus master 12 receives data processor instructions by way of instruction bus 25.

Bus master 12 has instruction decode circuitry 13 which is used to decode instructions received from instruction bus 25. Instruction decode circuitry 13 then provides a plurality of signals to control circuitry 14. Control circuitry 14 is bi-directionally coupled to reservation storage circuit 15. Control circuitry 14 receives a kill signal 34 and a cancel signal 44 from local bus 24, and provides a reserve signal 32 to local bus 24. Bus master 46 receives a kill signal 54 and a cancel signal 52 from local bus 24, and provides a reserve signal 50 to local bus 24. Note that in one embodiment of the present invention, the address/data/control signals 30, the reserve signal 32, the kill signal 34, the cancel signal 44, the reserve signal 50, the cancel signal 52, and the kill signal 54 are all part of local bus 24. Local bus 24, remote bus 26, and instruction bus 25 each includes a plurality of conductors which are used to transfer the bus signals.

Local bus 24 is coupled to remote bus 26 by way of bus interface circuitry 70. In one embodiment of the present invention, bus interface circuitry 70 includes snoop circuitry 40, reservation circuitry 72, and other circuitry 20. Snoop circuitry 40 receives reserve signals 32 and 50 and address/control signals 33 from local bus 25. Snoop circuitry 40 provides cancel signals 44 and 52 to local bus 24. Snoop circuitry 40 is bi-directionally coupled to reservation circuitry 72 by way of signals 42. Reservation circuitry 72 receives the reserve signals 32 and 50 from local bus 24, and reservation circuitry 72 provides the kill signals 34 and 54 to local bus 24. Also, reservation circuitry 72 receives the reservation inactive signals 36 and 56 from remote bus 26, and reservation circuitry 72 provides the reserve signals 28 and 58 to remote bus 26.

In alternate embodiments of the present invention, bus interface circuitry 70 may include only other circuitry 20 and may function in the same manner as prior art bus interfaces. In these embodiments, reservation circuitry 72 and snoop circuitry 40 are not included as part of bus interface circuitry 70.

Other circuitry 20 is bi-directionally coupled to local bus 24 by way of address/data/control signals 30, is bi-directionally coupled to remote bus 26 by way of address/data/control signals 31, and is bi-directionally coupled to reservation circuitry 72 by way of signals 38. Reservation circuitry 74 provides the reservation inactive signals 36 and 56 to remote bus 26, and reservation circuitry 74 receives the reserve signals 28 and 58 from remote bus 26. Other bus slaves (not shown) and other bus masters (not shown) may be coupled directly to remote bus 26.

Figure 3:
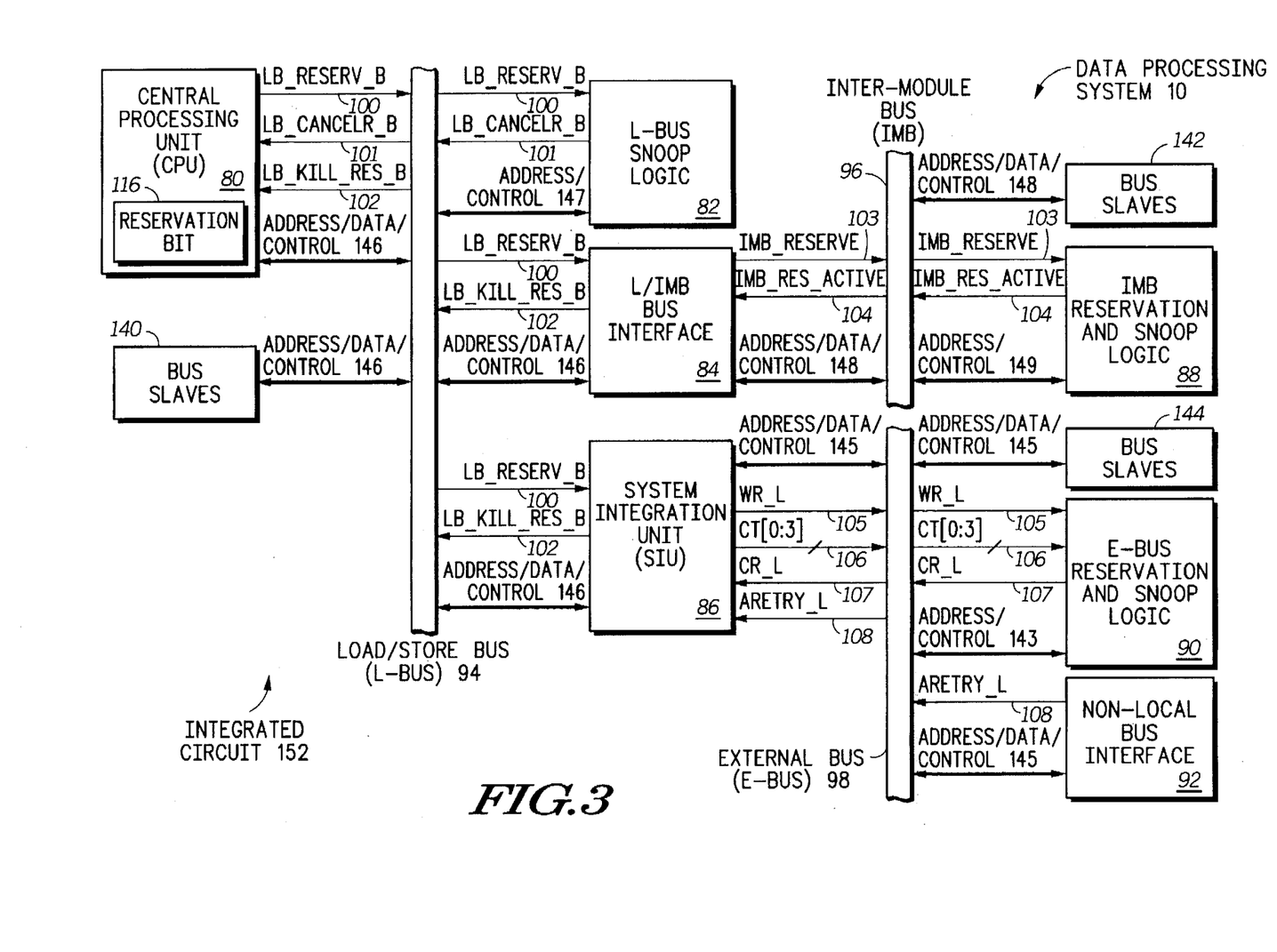
FIG. 3 illustrates, in block diagram form, a data processing system in accordance with an alternate embodiment of the present invention.

FIG. 3 illustrates a data processing system 10 in accordance with an alternate embodiment of the present invention. FIG. 3 illustrates a data processing system 10 having a load/store bus (L-bus) 94, an inter-module bus (IMB) 96, and an external bus (E-bus) 98. Central processing unit (CPU) 80, bus slaves 140, L/IMB bus interface 84, and System Integration Unit (SIU) 86 are bi-directionally coupled to L-bus 94 by way of address/data/control signals 146. L-bus snoop logic 82 is bi-directionally coupled to L-bus 94 by way of address/control signals 147.

Figure 9:
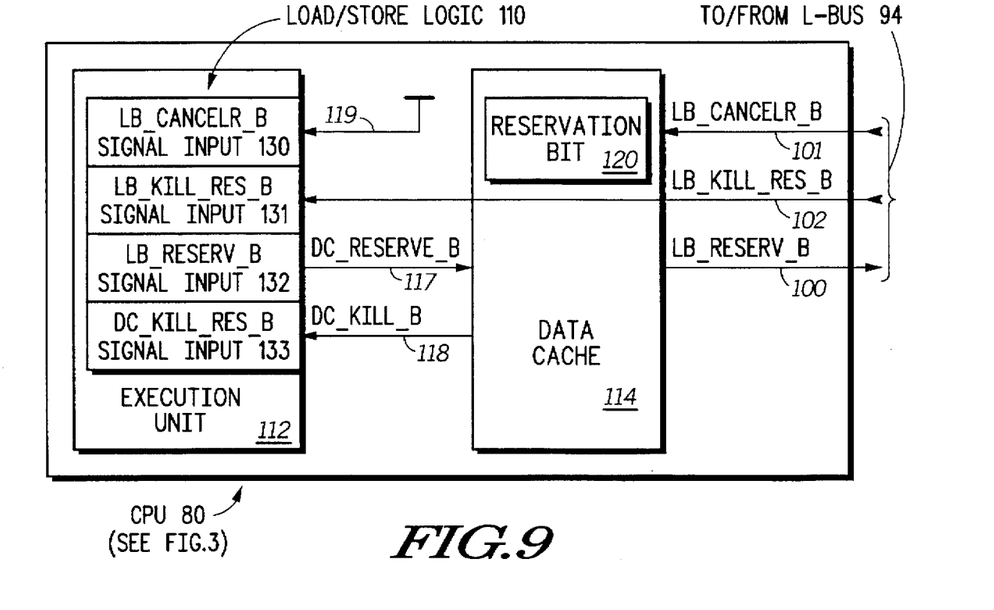
FIG. 9 illustrates, in block diagram form, a portion of CPU 80 of FIG. 3 in accordance with one embodiment of the present invention.

Note that in one embodiment of the present invention, the names of the L-bus 94 signals which are active low end in the suffix "_B", for example the LB$_{13}$ CANCELR$_{13}$ B signal 101. In alternate embodiments of the present invention, the L-bus 94 signals may be either active low or active high. CPU 80 receives the LB_CANCELR_B signal 101 and the LB_KILL_RES_B signal 102 from L-bus 94. CPU 80 provides the LB_RESERV_B signal 100 to L-bus 94. In one embodiment, CPU 80 includes circuitry 13–15 as illustrated in CPU 12 in FIGS. 1 and 2. In an alternate embodiment, CPU 80 includes a data cache 114 as illustrated in FIG. 9. Reservation bit 116 in FIG. 3 serves a similar function to reservation storage circuit 15 in FIGS. 1 and 2.

L-bus snoop logic 82 receives the LB_RESERV_B signal 100 from L-bus 94, and provides the LB_CANCELR_B signal 101 to L-bus 94. L/IMB bus interface 84 receives the LB_RESERV_B signal 100 from L-bus 94, and provides the LB_KILL_RES_B signal 102 to L-bus 94. SIU 86 receives the LB_RESERV_B signal 100 from L-bus 94, and provides the LB_KILL_RES_B signal 102 to L-bus 94.

L/IMB bus interface 84 and bus slaves 142 are bi-directionally coupled to IMB 96 by way of address/data/control signals 148. IMB reservation and snoop logic 88 is bi-directionally coupled to IMB 96 by way of address/control signals 149. L/IMB bus interface 84 receives the IMB_RES_ACTIVE signal 104 from IMB 96, and provides the IMB_RESERVE signal 103 to IMB 96. IMB reservation and snoop logic 88 receives the IMB_RESERVE signal 103 from IMB 96, and provides the IMB_RES_ACTIVE signal 104 to IMB 96.

Note that the IMB_RES_ACTIVE signal 104 is asserted when the reservation is active, and is negated when the reservation is not active. The IMB_RES_ACTIVE signal 104 could be replaced with a cancel signal (e.g. 101 or 107) which is when the reservation is not active, and is negated when the reservation is active. Any of the control signal illustrated in FIGS. 1-3 could be replaced with an inverse signal merely by adding inverting logic gates.

Note that in one embodiment of the present invention, the names of the E-bus 98 signals which are active low end in the suffix "_L", for example the ARETRY_L signal 108. In alternate embodiments of the present invention, the E-bus 98 signals may be either active low or active high.

SIU 86, bus slaves 144, and non-local bus interface 92 are bi-directionally coupled to E-bus 98 by way of address/data/control signals 145. E-bus reservation and snoop logic 90 is bi-directionally coupled to E-bus 98 by way of address/control signals 143. SIU 86 receives the CR_L signal 107 and the ARETRY_L signal 108 from E-bus 98, and provides the WR_L signal 105 and the CT[0:3]signals 106 to E-bus 98. E-bus reservation and snoop logic 90 receives the WR_L signal 105 and the CT[0:3]signals 106 from E-bus 98, and provides the CR_L signal 107 to E-bus 98. Non-local bus interface 92 provides the ARETRY_L signal 108 to E-bus 98.

Note that in one embodiment of the present invention, the reservation functions performed by reservation circuitry 18 and other circuitry 20 in FIG. 1 are performed by L/IMB bus interface 84. Likewise, the reservation functions performed by reservation circuitry 18 and other circuitry 20 in FIG. 1 are performed by SIU 86. If L-bus 94 has multiple bus masters coupled directly to it, then L/IMB bus interface 84 performs the reservation functions in a similar manner to reservation circuitry 72 and other circuitry 20 in FIG. 2. Likewise, SIU 86 performs the reservation functions in a similar manner to reservation circuitry 72 and other circuitry 20 in FIG. 2.

In one embodiment of the present invention, data processing system 10 in FIG. 3 is located on a single integrated circuit 152, with the exception of E-bus 98, E-bus reservation and snoop logic 90, bus slaves 144, and non-local bus interface 92. In this embodiment, SIU 86 receives and provides signals 105–108 and 145 by way of integrated circuit bonding pads, which may be coupled to integrated circuit pins or other types of integrated circuit packaging conductors.

Note that the embodiment of data processing system 10 illustrated in FIG. 3 may have one or more bus masters coupled directly to one or more of busses 94, 96, and 98. For example, a bus master such as bus master 46 illustrated in FIG. 2 may be coupled to coupled to L-bus 94, may be coupled to IMB 96 and/or may be coupled to E-bus 92. Note that the snoop logic associated with a bus must receive a different reserve signal from each bus master coupled directly to that bus, and must provide a different cancel signal to each bus master coupled directly to that bus (see circuits 12, 46, and 40 in FIG. 2)

FIG. 9 illustrates one embodiment of CPU 80 of FIG. 3. CPU 80 has an execution unit 112 and a data cache 114. Data cache 114 is coupled between the execution unit 112 and L-bus 94. Execution unit 112 has load/store logic 110. Load/store logic 110 includes a LB_CANCELR_B signal input 130 for receiving a constant logic level by way of conductor 119. The constant logic level may either be a logic level "0" or a logic level "1". Load/store logic 110 includes a LB_KILL_RES_B signal input 131 for receiving the LB_KILL_RES_B signal 102 from L-bus 94 by way of data cache 114. Load/store logic 110 includes a LB_RESERV_B signal output 132 for providing the DC_KILL_B signal 117 to data cache 114. Load/store logic 110 includes a DC_KILL_RES_B signal input 133 for receiving the DC_KILL_B signal 118 from data cache 114. Load/store logic 110 also includes a reservation bit 116 (see FIG. 3).

Data cache 114 has a reservation bit 120. Data cache 114 receives the LB_CANCELR_B signal 101 from L-bus 94 and provides the LB_RESERV_B signal 100 to L-bus 94. Also, data cache 114 receives the LB_KILL_RES_B signal 102 from L-bus 94 and passes the signal on to load/store logic 110.

Operation of the Preferred Embodiments

Instead of locking busses or requiring each bus master to have on-board snoop logic, the present invention utilizes a different approach to guarantee atomic accesses in a data processing system. The present invention uses control signals which are exchanged between the one or more bus masters and the one or more blocks of reservation circuitry. In one embodiment of the present invention, each bus interface between two busses has its own reservation circuitry. The reservation circuitry may be incorporated as part of the bus interface, or may be separate logic which is coupled to the bus interface. Also, the present invention does not require that the bus masters have snoop logic. Instead, each bus may have its own snoop logic; however, a bus only requires snoop logic if there is more than one bus master coupled directly to that same bus.

The present invention thus allows atomic accesses to be performed in a multi-master data processing system, while minimizing the circuitry required to be built on-board each bus master processor. As a result, lower cost processors can be designed which are optimized for use in single-processor systems. However, by utilizing the capabilities of the present invention, these lower cost processor can still be used effectively in multi-processor systems.

In addition, at least one embodiment of the lower cost approach must maintain instruction set compatibility with the PowerPc™ family of data processors. Thus at least one embodiment must use the system of "reservations" as defined by the "LWARX" and "STWCX" instructions in the PowerPC™ family of data processors. Alternate embodiments of the present invention may not be instruction set compatible with the PowerPC™ family of data processors.

In one embodiment, the present invention provides a Storage Reservation protocol which supports a multi-level bus structure. For each bus, storage reservation is handled by the local reservation logic which is coupled directly to that bus.

The Storage Reservation protocol tries to optimize reservation cancellation such that a bus master is notified of storage reservation loss on a remote bus only when it is executing a STWCX instruction and has issued a STWCX bus cycle to that address. That is, the reservation loss indication is returned to the bus master as part of the STWCX bus cycle of the STWCX instruction. This method avoids the need to have very fast storage reservation loss indication signals routed from every remote bus to every bus master.

In the PowerPc™ family of data processors, each processor has at most one reservation. If a first processor executes the LWARX instruction, a reservation is established for the first processor. If the first processor then executes the LWARX again, the previous reservation is negated and a new reservation is established at the new address. If the first processor executes the STWCX instruction, then the reservation for the first processor is negated. Note that execution by the first processor of a store instruction, other than the STWCX instruction, will not negate the first processor's reservation. However, if another processor or another bus master executes a store instruction to the same address as an existing reservation, the existing reservation is negated. The PowerPc™ approach to reservations thus guarantees that if a reservation is lost, a subsequent STWCX instruction will not modify the value stored at the reserved address.

The size of the block of memory which may be reserved by a single reservation can be fixed at a predetermined size in some data processing systems, and may be programmably variable in other data processing systems. In some data processing systems, the block size is the size of a cache line.

In the present invention, each bus has its own reservation circuitry. For example, referring to FIG. 1, local bus 24 has reservation circuitry 18, and remote bus 26 has reservation circuitry 60. In one embodiment of the present invention, each reservation circuitry associated with a bus carries out the following functions. First, the reservation circuitry is capable of holding one reservation for each local bus master which is capable of requesting a reservation. Second, the reservation circuitry actually asserts and holds a reservation for a bus master which issues a LWARX bus cycle while executing a LWARX instruction. Third, the reservation circuitry negates and stops holding the reservation when some other bus master executes a store instruction and issues a store bus cycle to the reservation address location.

Note that if a bus has multiple bus masters coupled directly to the bus, then the bus will have its own associated snoop circuitry. For example, since local bus 24 in FIG. 2 has two bus masters, namely bus master 12 and bus master 46, snoop logic 40 is required to be coupled to bus 24. Snoop logic 40 is used to monitor bus 24 and to determine when a second bus master issues a store bus cycle to a local bus slave 14, 16 at an address location which is reserved by a first bus master. The snoop logic thus "snoops" the store bus cycles on local bus 24 and determines when a reservation by a first bus master has been violated by a store access performed by a second bus master.

In one embodiment of the present invention, bus interface circuitry can be used to extend the Storage Reservation protocol to multi-level bus structures. Bus interface circuitry may be used to allow two or more busses to communicate and share information. For example, bus interface circuitry 22 in FIG. 1 allows local bus 24 and remote bus 26 to be coupled in order to communicate and share information. As another example, referring to FIG. 3, L/IMB bus interface 84 allows L-bus 94 and IMB bus 96 to be coupled in order to communicate and share information.

Also, still referring to FIG. 3, SILT 86 allows L-bus 94 and E-bus 98 to be coupled in order to communicate and share information. Thus CPU 80 can communicate with even more remote busses (not shown) by way of L-bus 94, SIU 86, and non-local bus interface 92. In this manner, even more remote busses can be added to data processing system 10.

In one embodiment of the present invention, each bus interface guarantees that in case Storage Reservation is lost for a particular address location, a subsequent STWCX bus cycle to that particular address location will not modify the value stored in that particular address location. If a bus supports aborted cycles, the bus interface may implement this requirement by issuing a bus cycle and aborting it. If the bus does not support aborted cycles, then the bus cycle should not be issued in order to prevent the value stored in the designated address location from being modified.

If multiple bus masters are to be supported, then snoop logic is required. The snoop logic may either be implemented as part of the bus interface (see FIG. 2 where snoop circuitry 40 is part of bus interface circuitry 70), or the snoop logic may be implemented separately from the bus interface (see FIG. 3 where L-bus snoop logic 82 is not part of L/IMB bus interface 84).

Referring to FIG. 3, if the snoop logic 82 is not part of the bus interface 84, the snoop logic 82 must use the bus 94 to transfer control signals to the bus interfaces 84 and 86. The snoop logic 82 needs to indicate the current status of the local bus reservation so that the bus interfaces 84 and 86 have the current status information prior to the address phase of the STWCX bus cycle. The snoop logic 82 provides the LB_CANCELR_B signal 101 to indicate that the storage reservation has been lost. The snoop logic 82 must provide the LB_CANCELR_B signal 101 early enough to prevent STWCX bus cycles from being issued on bus 94. Bus interfaces 84 and 86 must receive the current status information to assert the reservation in time to enable a store to the reservation address, and to negate the reservation fast enough to disable a store to the reservation address.

Referring to FIG. 3, in the illustrated embodiment of the present invention, CPU 80 is the only bus master and is capable of requesting one reservation. Note that the L-bus snoop logic 82 is only required if another bus master (not shown) is capable of accessing the bus slaves directly coupled to L-bus 94. In one embodiment of the present invention, L-bus 94 supports aborted bus cycles. Also, in one embodiment of the present invention, CPU 80 includes the same circuitry 13–15 as illustrated in FIG. 2. The reservation storage circuit in CPU 80 is a register bit in a user programmable register.

Referring to FIG. 3, in one embodiment of the present invention, CPU 80 establishes a reservation by asserting the LB_RESERV_B signal during a load operation. Reservation circuitry in the L/IMB bus interface 84 and reservation circuitry in the SIU 86 determine if the reservation has been broken by any other bus master which has access to L-bus 94. In addition, if the reservation on a remote bus (e.g. E-bus 98 or IMB 96) has been violated (e.g. by a remote bus master), then during a STWCX bus cycle to a remote bus, the bus interface to the remote bus is responsible for aborting the store and informing CPU 80 that the STWCX bus cycle has been canceled.

In one embodiment, the present invention provides a Storage Reservation protocol which supports a multi-level bus structure. For each bus, storage reservation is handled by the local reservation logic which is coupled directly to that bus. The particular signals and circuitry used to implement the Storage Reservation protocol can vary from bus to bus within one data processing system. For example, the data processing system 10 illustrated in FIG. 3 uses different implementations of the Storage Reservation protocol for each of the three busses, namely L-bus 94, IMB 96, and E-bus 98.

The manner in which the Storage Reservation protocol is implemented on L-bus 94 will now be discussed. Each bus interface on L-bus 94 is responsible for properly handling the effects of reservations. This means that SIU 86 needs reservation circuitry for handling external reservations. The L/IMB bus interface 84 needs reservation circuitry to cancel reservations if a bus master (not shown) is coupled directly to IMB 96.

Figure 4:
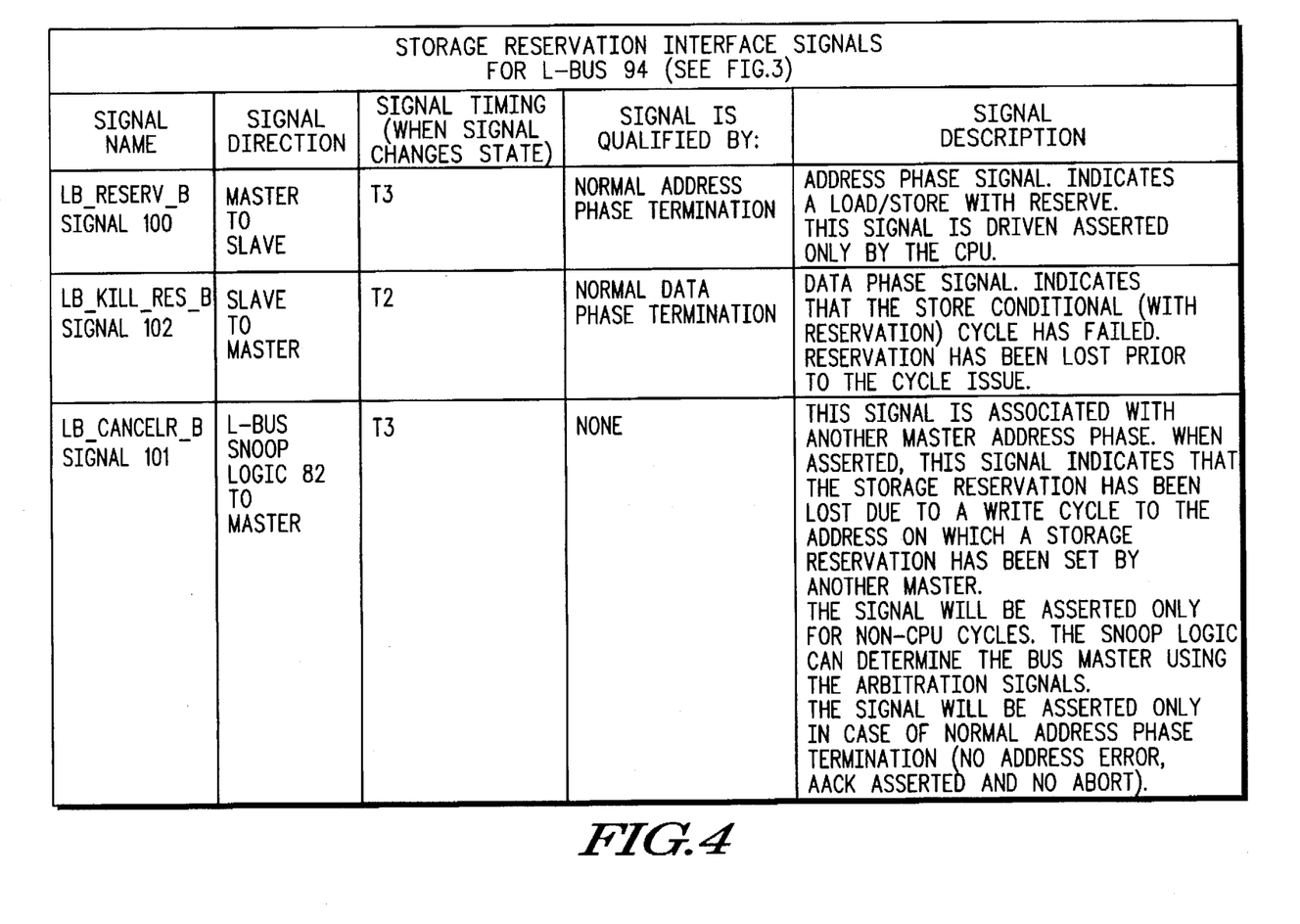
FIG. 4 illustrates, in tabular form, storage reservation interface signals in accordance with one embodiment of the present invention.
Figure 5:
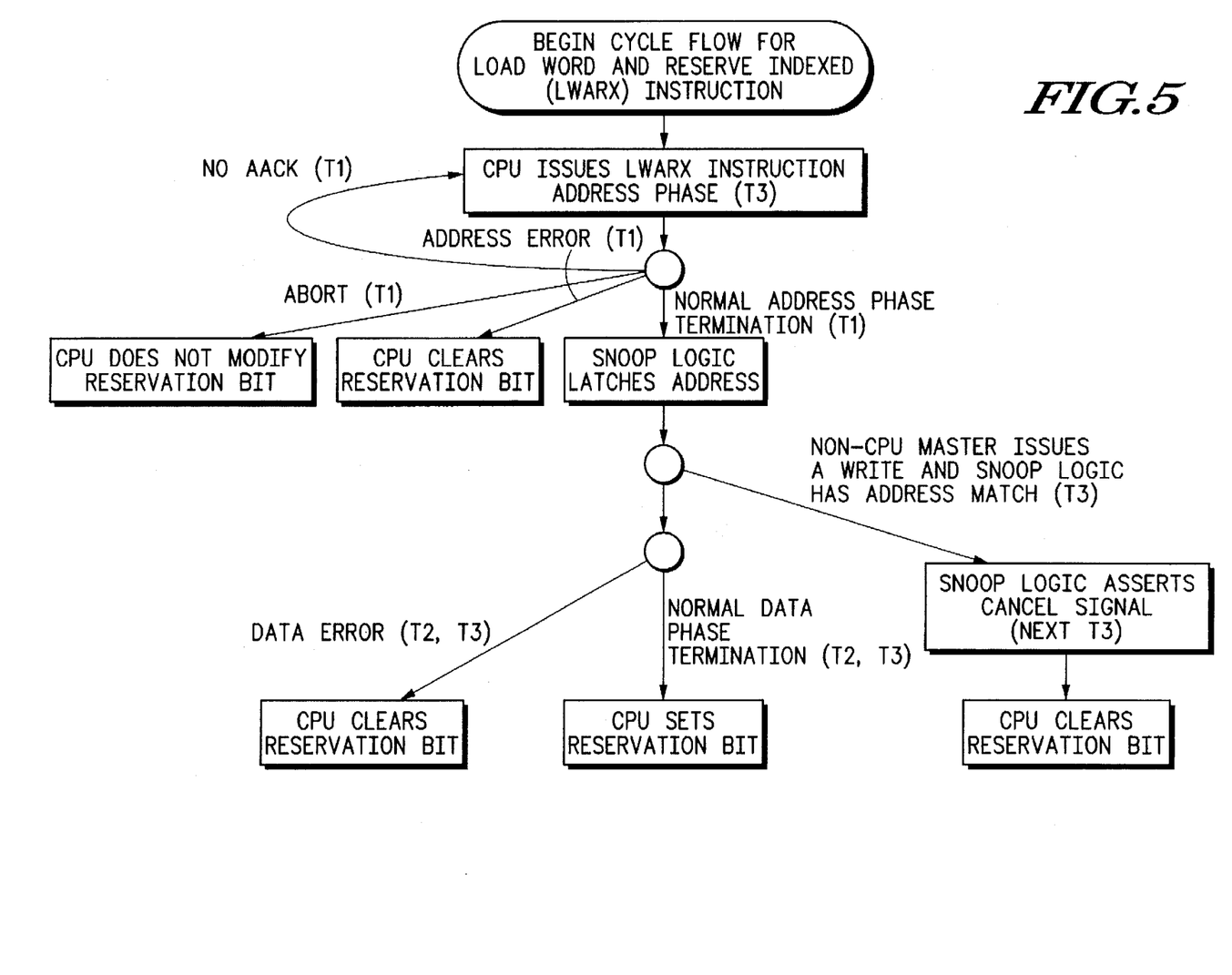
FIG. 5 illustrates, in flow diagram form, steps performed during execution of the "LWARX" instruction in accordance with one embodiment of the present invention.
Figure 6:
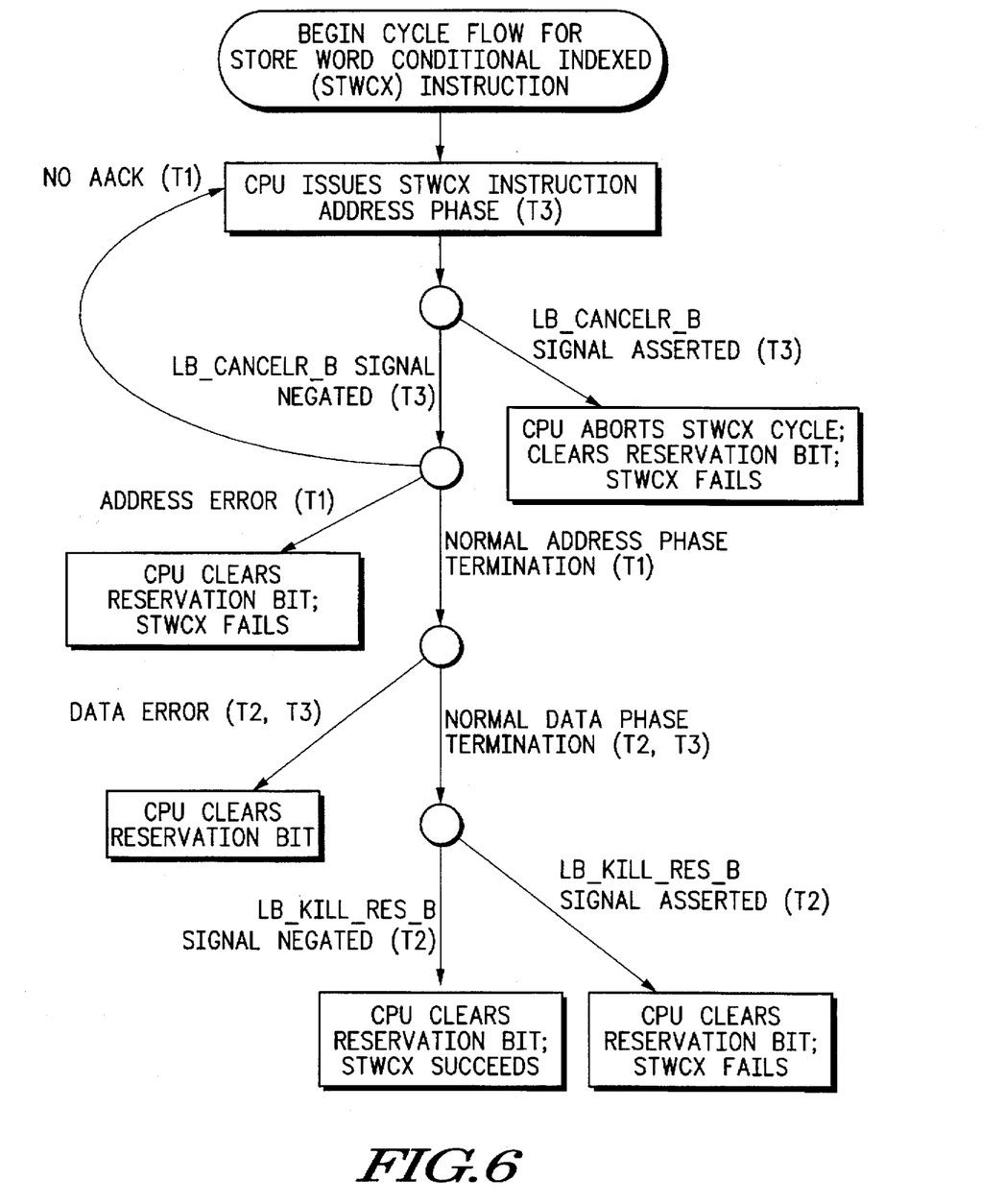
FIG. 6 illustrates, in flow diagram form, steps performed during execution of the "STWCX" instruction in accordance with one embodiment of the present invention.

FIG. 4 defines the storage reservation interface signals for L-bus 94 and how they are used in one embodiment of the present invention. Referring to FIGS. 4–6, note that T1, T2, T3, and T4 refer to the four equal time slots which make up each execution cycle in CPU 80. The timing used in FIGS. 4–6 is given as an example only. Other timing may be used in alternate embodiments. Note that in one embodiment of the present invention, the LB_CANCELR_B signal 101 will not be asserted in case of an address error, an aborted cycle, or in case an address acknowledge signal (AACK) is not asserted on L-bus 94. In an alternate embodiment of the present invention, the LB_CANCELR_B signal 101 may be asserted for any non-CPU bus cycle address phase start, regardless of the bus cycle address phase termination (i.e. address error, abort, no AACK).

Continuing with the manner in which the Storage Reservation protocol is implemented on L-bus 94, FIG. 5 illustrates some of the steps which are performed when CPU 80 executes the LWARX instruction. The LWARX instruction sets up a reservation for CPU 80. If execution of the LWARX instruction is successfully completed, then CPU 80 asserts the reservation bit 116. If the address associated with the LWARX bus cycle indicates that an access to E-bus 98 is required, SIU 86 must makes sure that a storage reservation is asserted for the address location provided by CPU 80 on L-bus 94 during the LWARX bus cycle.

In one embodiment of the present invention, if the LWARX bus cycle terminates abnormally, SIU 86 will not assert a storage reservation for the associated address location. Possible abnormal LWARX bus cycle terminations are address error, data error, and no address acknowledge signal received. However, if the LWARX bus cycle terminates normally, then CPU 80 asserts its internal reservation bit 116. In one embodiment of the present invention, if an address phase of the LWARX bus cycle terminates abnormally, the L-bus snoop logic 82 will ignore the LWARX bus cycle and will not latch the address.

Referring to FIG. 5, the abort on a LWARX bus cycle may originate from an unaligned exception condition or an external interrupt condition. In any case, the reservation bit 116 in CPU 80 is not modified. That is, if the reservation bit 116 in CPU 80 was asserted by a previous LWARX instruction, the reservation bit 116 will remain asserted if an abort occurs.

Continuing with the manner in which the Storage Reservation protocol is implemented on L-bus 94, FIG. 6 illustrates some of the steps which are performed when CPU 80 executes the STWCX instruction. The STWCX instruction stores a value in a reserved address location and negates the reservation for CPU 80. If execution of the STWCX instruction is initiated, then CPU 80 negates the reservation bit 116, regardless of whether or not the STWCX bus cycle is terminated normally.

During the STWCX bus cycle, CPU 80 issues a normal write cycle with the LB_RESERV_B signal 100 asserted. If the reservation has been lost (i.e. due to a previous write access to that same address by another bus master), one of L/IMB bus interface 84 and SIU 86 will assert the LB_KILL_RES_B signal 102 in order to kill the reservation. In one embodiment of the present invention, the LB_KILL_RES_B signal 102 is asserted on data phase termination. When CPU 80 receives the asserted LB_KILL_RES_B signal 102, CPU 80 negates its reservation bit 116.

Referring to FIG. 3, if L-bus 94 has multiple bus masters (e.g. two CPUs 80) coupled directly to it, then L-bus snoop logic 82 is required. As illustrated in FIG. 5, L-bus snoop logic 82 latches the reservation address from L-bus 94 during the LWARX bus cycle. Then during a subsequent STWCX bus cycle, L-bus snoop logic 82 compares the current address on L-bus 94 with the stored reservation address to determine if the addresses are the same. If a bus master other than CPU 80 issues a normal write bus cycle to an address which matches the reservation address previously latched by the L-bus snoop logic 82, and the address phase of the STWCX bus cycle terminates normally, then the L-bus snoop logic 82 asserts the LB_CANCELR_B signal 101. In response to receiving the asserted LB_CANCELR_B signal 101, CPU 80 will negate its reservation bit 116. If a STWCX bus cycle has been issued by CPU 80 at that time, the STWCX bus cycle will be aborted.

Figure 7:
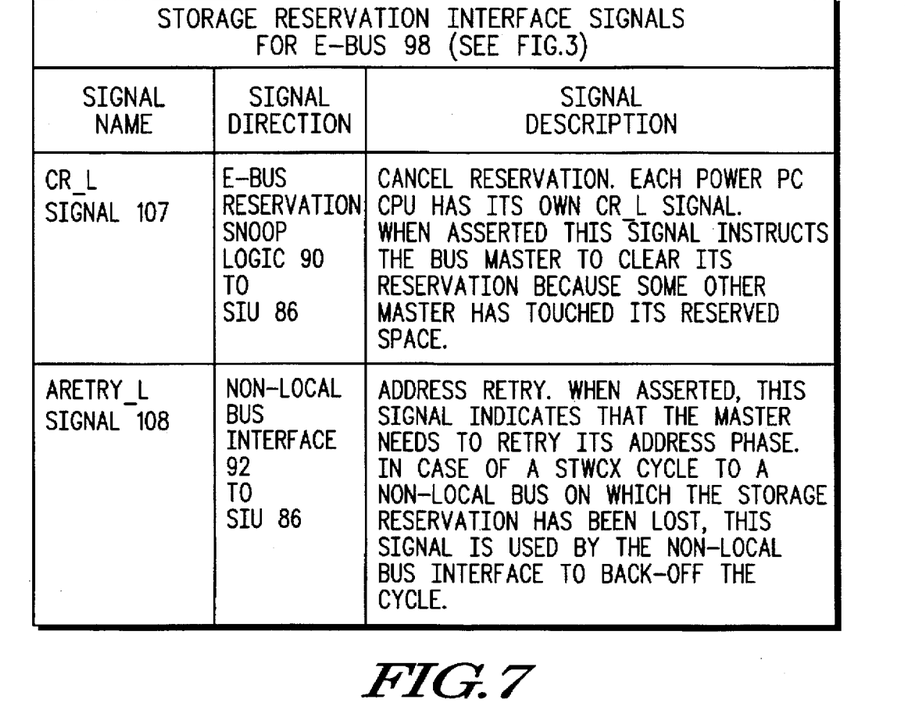
FIG. 7 illustrates, in tabular form, storage reservation interface signals in accordance with one embodiment of the present invention.

The manner in which the Storage Reservation protocol is implemented on E-bus 98 will now be discussed. FIG. 7 defines the storage reservation interface signals for E-bus 98 and how they are used in one embodiment of the present invention. Referring to FIG. 3, E-bus 98 uses E-bus reservation and snoop logic 90 to provide the control signals for implementing the Storage Reservation protocol. The snoop portion of E-bus reservation and snoop logic 90 is only required if there are multiple bus masters capable of accessing the bus slaves coupled directly to E-bus 98. In one embodiment of the present invention, E-bus 98 does not support aborted cycles.

E-bus reservation and snoop logic 90 performs several different functions. It holds one reservation for each local bus master which is capable of requesting a reservation. It asserts the reservation for a bus master when that bus master requests a load operation with reservation (i.e. by executing a LWARX instruction). And, it clears a reservation when some other bus master issues a store operation to the reservation address.

E-bus reservation and snoop logic 90 must assert the reservation in time to enable a store to the reservation address, and must clear the reservation fast enough to disable a store to the reservation address. In one embodiment of the present invention, E-bus reservation and snoop logic 90 meets this timing requirement by indicating the current status of the local bus reservation such that it may be sampled prior to the address phase of a subsequent STWCX bus cycle. If multiple bus masters are directly coupled to E-bus 98, then E-bus reservation and snoop logic 90 must snoop accesses to all bus slaves directly coupled to E-bus 98 in order to determine if any reservation has been violated.

The SIU 86 is also involved when CPU 80 requests a reservation to an address that is accessed by way of E-bus 98. SIU 86 samples the CR_L signal 107 prior to starting a STWCX bus cycle on E-bus 98. If the CR_L signal 107 indicates that CPU 80 no longer has a reservation, then SIU 86 does not begin a STWCX bus cycle on E-bus 98. In addition, SIU 86 asserts LB_KILL_RES_B signal 102 on L-bus 94. In response to the assertion of the LB_KILL_RES_B signal 102 on L-bus 94, CPU 80 negates reservation bit 116 to indicate that the reservation has been lost. However, if the CR_L signal 107 indicates that CPU 80 still has a reservation, then SIU 86 begins a STWCX bus cycle on E-bus 98.

If the ARETRY_L signal 108 is asserted, then SIU 86 must resample the CR_L signal 107 prior to performing the retry on E-bus 98. Non-local bus interfaces 92 and ARETRY_L signals 108 may be used to extend the present invention to any number of busses. For example, non-local bus inter#ace 92 may be coupled to another bus named A-bus (not shown). Then a second non-local bus interface 92 (not shown) may be coupled between A-bus and an additional bus named B-bus (not shown). As long as each bus is coupled to the next by a non-local bus interface 92 which provides an ARETRY_L signal 108, reservation coherency can be maintained in data processing system 10.

If a reservation exists on a non-local bus, and SIU 86 begins a STWCX bus cycle to that reservation address on the local bus while the non-local bus reservation is cleared, the ARETRY_L signal 108 should be asserted and provided to SIU 86, and the cancel reservation CR_L signal 107 should be asserted prior to giving SIU 86 mastership of the bus. The address acknowledge signal (AACK) should not be returned until successful coherent completion of the STWCX bus cycle is assured. The non-local bus interface 92 should not perform to the non-local write to A-bus (not shown) if the local bus interface 92 asserts the ARETRY_L signal 108.

SIU 86 may require a minimum time between a LWARX bus cycle and a STWCX bus cycle, depending upon the number of non-local bus interfaces (not shown) and the number of busses (not shown) which are coupled to non-local bus interface 92.

If CPU 80 is the only bus master in data processing system 10, then the cancel reservation CR_L signal 107 is not required and may be forced to the logic state which indicates that the reservation is valid (e.g. by connecting the reservation integrated circuit pin to a power supply voltage such as power or ground). The CR_L signal 107 is not required in a single-master system because there is no other bus master which can execute a store to the reserved address and thus cause the reservation to be lost. In an alternate embodiment of the present invention, the reservation integrated circuit pin (i.e. the pin which receives the CR_L signal 107) may be configured as a general purpose input/output port pin. If the reservation pin is configured as a general purpose input/output port pin, the SIU 86 will always consider the reservation to be valid.

In one embodiment of the present invention, the read/write (WR_L) signal 105 and the cycle type (CT[0:3]) signals 106 are used to indicate when SIU 86 is issuing a reservation bus cycle as a result of CPU 80 executing a LWARX or STWCX instruction. One encoding of the CT[0:3]signals 106(e.g. %0001) is used to indicate that a reservation bus cycle is being issued on E-bus 98 as a result of CPU 80 executing a LWARX or STWCX instruction. The WR_L signal 105 is used to differentiate between reservation bus cycles which are read bus cycles (for LWARX) and which are write bus cycles (for STWCX).

Figure 8:
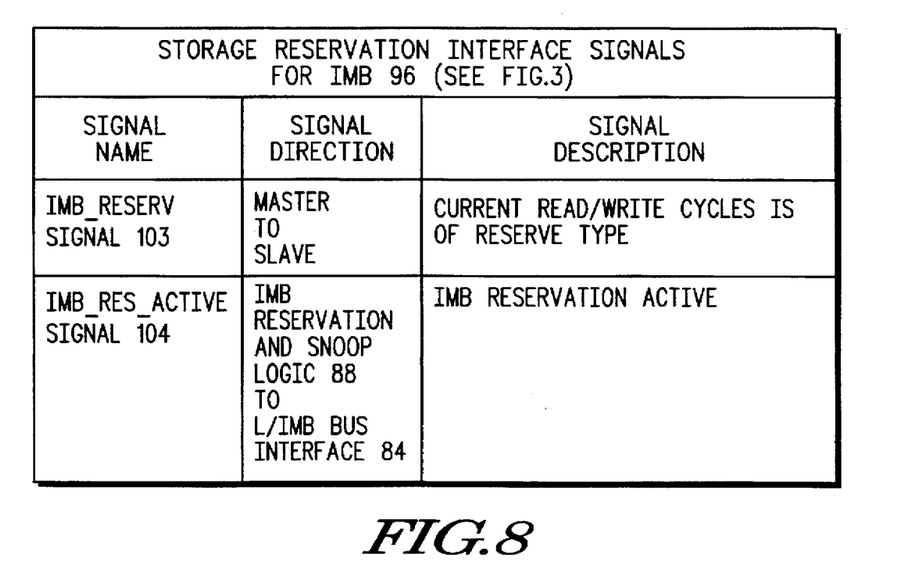
FIG. 8 illustrates, in tabular form, storage reservation interface signals in accordance with one embodiment of the present invention.

The manner in which the Storage Reservation protocol is implemented on the inter-module bus (IMB) 96 will now be discussed. FIG. 8 defines the storage reservation interface signals for IMB 96 and how they are used in one embodiment of the present invention.

Referring to FIG. 3, IMB 96 uses IMB reservation and snoop logic 88 to provide the control signals for implementing the Storage Reservation protocol. The snoop portion of IMB reservation and snoop logic 88 is only required if there are multiple bus masters capable of accessing the bus slaves coupled directly to IMB 96. In one embodiment of the present invention, IMB 96 does not support aborted cycles.

IMB reservation and snoop logic 88 performs several different functions. It holds one reservation for each local bus master which is capable of requesting a reservation. It asserts the reservation for a bus master when that bus master requests a load operation with reservation (i.e. by executing a LWARX instruction). And, it clears a reservation when some other bus master issues a store operation to the reservation address.

When L/IMB bus interface 84 receives an asserted LB_RESERV_B signal 100 (i.e. CPU 80 is executing a LWARX instruction), and an address or control portion of L-bus 94 indicates that the access is to a bus slave coupled directly to IMB 96, the L/IMB asserts the IMB_RESERVE signal 103. The assertion of the IMB_RESERVE signal 103 thus indicates to the IMB reservation and snoop logic 88 that the present bus cycle is a LWARX bus cycle to IMB 96.

IMB reservation and snoop logic 88 asserts the IMB_RES_ACTIVE signal 104 when a reservation is being held, and negates the IMB_RES_ACTIVE signal 104 when a reservation is not being held or has been violated by another bus master. If the IMB_RES_ACTIVE signal 104 indicates that the reservation is active, the L/IMB bus interface 84 initiates a STWCX bus cycle on IMB 96. If the IMB_RES_ACTIVE signal 104 indicates that the reservation is not active, the L/IMB bus interface 84 will not initiate a STWCX bus cycle on IMB 96, but will instead assert the LB_KILL_RES signal 102. When CPU 80 receives the asserted LB_KILL_RES signal 102, CPU 80 negates reservation bit 116 to indicate that the reservation has been lost. CPU 80 also aborts the STWCX bus cycle on L-bus 94.

If multiple bus masters are directly coupled to IMB 96, then IMB reservation and snoop logic 88 must snoop accesses to all bus slaves directly coupled to IMB 96 in order to determine if any reservation has been violated. Note that the embodiment illustrated in FIG. 3 has only one bus master (i.e. CPU 80), and thus there is only one LB_RESERV_B signal 100, one LB_KILL_RES_B signal 102, one IMB_RESERVE signal 103, and one IMB_RES_ACTIVE signal 104. If the data processing system 10 illustrated in FIG. 3 had multiple bus masters, it would require additional signals as illustrated in FIG. 2.

If CPU 80 is the only bus master in data processing system 10, then the IMB_RES_ACTIVE signal 104 is not required and may be forced to the logic state which indicates that the reservation is valid (e.g. by connecting the IMB_RES_ACTIVE conductor to a power supply voltage such as power or ground). The IMB_RES_ACTIVE signal 104 is not required in a single-master system because there is no other bus master which can execute a store to the reserved address and thus cause the reservation to be lost.

Figure 10:
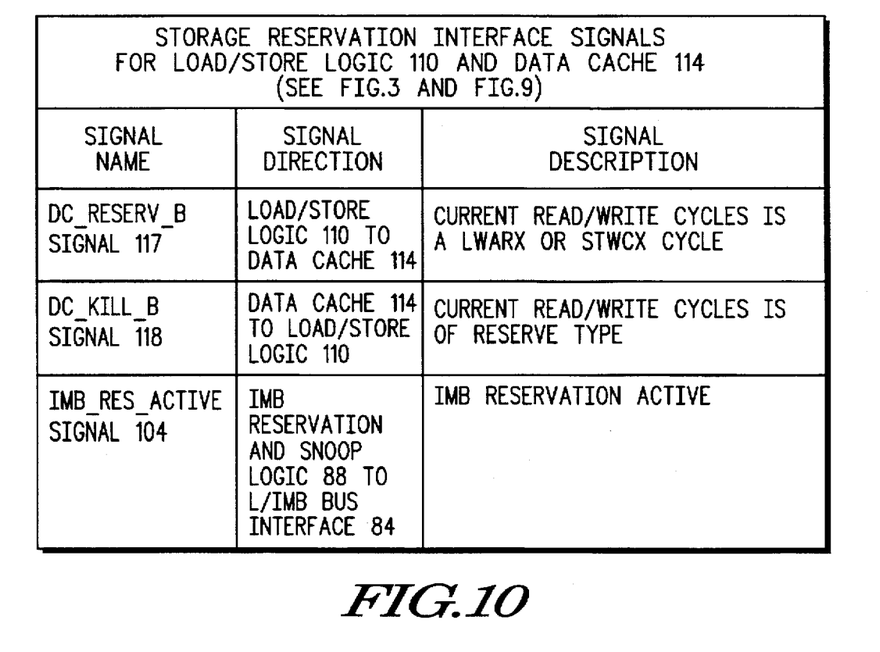
FIG. 10 illustrates, in tabular form, storage reservation interface signals in accordance with one embodiment of the present invention.

FIGS. 9 and 10 refer to an alternate embodiment of CPU 80 (see FIG. 3) which may be used in the present invention. The embodiment of CPU 80 illustrated in FIG. 8 includes a data cache 114 which is coupled between execution unit 112 and L-bus 94. The data cache 114 therefore receives the L-bus signals 100–101 which relate to reservations and provides the load/store logic 110 with the signals 102 and 117–118 which the load/store logic 110 requires to implement reservations.

Data cache 114 functions as a write queue for the load/store logic 110. Cache coherency can be implemented in either hardware or software. In one embodiment, data cache 114 has a reservation bit 120 which indicates whether or not CPU 80 has an active reservation. In one embodiment of the present invention, reservation bit 120 may be a status bit in a user accessible register.

Note that in one embodiment of the present invention, the LB_CANCELR_B signal input 130 is coupled to a predetermined logic state which forces the signal to always be negated. This is due to the fact that the LB_CANCELR_B signal 101 from L-bus 94 may be received after the STWCX bus cycle address phase from load/store logic 110 to the data cache 114 has completed and before the corresponding bus cycle is issued from data cache 114 to L-bus 94.

A reservation is asserted by having CPU 80 execute a LWARX instruction. In one embodiment of the present invention, the following steps are performed during execution of the LWARX instruction. Load/store logic 110 issues a read cycle and asserts the DC_RESERVE_B signal 117. In response, data cache 114 asserts its internal reservation bit 120. Data cache 114 also issues a read cycle on L-bus 94 with the LB_RESERV_B signal 100 asserted. At this point, the LWARX bus cycle proceeds as described in FIG. 5. In one embodiment of the present invention, the reservation bit 120 in data cache 114, unlike the reservation bit 116, is not negated if the LWARX bus cycle terminates abnormally.

A reservation is negated by having CPU 80 execute a STWCX instruction. In one embodiment of the present invention, the following steps are performed during execution of the STWCX instruction. Load/store logic 110 issues a write cycle and asserts the DC_RESERVE_B signal 117. If reservation bit 120 is negated, data cache 114 may terminate the STWCX bus cycle while asserting the LB_KILL_RES_B signal 102.

Alternately, data cache 114 may issue a write bus cycle on L-bus 94 while asserting the LB_RESERV_B signal 100. If the storage reservation has been lost either L/IMB interface 84 or SIU 86 (see FIG. 3) will assert the LB_KILL_RES_B signal 102 during the data phase termination of the STWCX bus cycle. If reservation bit 120 is negated, data cache 114 will assert the DC_KILL_B signal 118, which in turn causes reservation bit 116 to be negated. Thus, the store requested by the STWCX instruction fails if either the DC_KILL_B signal 118 or the LB_KILL_RES_B signal 102 is asserted.

Regardless of whether or not the STWCX bus cycle terminates normally, reservation bit 116 is negated as illustrated in FIG. 6. However, in some embodiment of the present invention, it is not necessary to negate reservation bit 120 in data cache 114 if the STWCX bus cycle terminates abnormally.

Referring to FIG. 3 and FIG. 9, if a second bus master (not shown) is coupled to L-bus 94, then the LB_CANCELR_B signal 101 will be used. Note that CPU 80 is the first bus master. If the second bus master (not shown) executes a write bus cycle, L-bus snoop logic 82 will compare the address of the write bus cycle to the reservation address previously latched by L-bus snoop logic 82. If the addresses match and the address phase of the write bus cycle terminates normally, L-bus snoop logic 82 will assert the LB_CANCELR_B signal 101 at the following T3 (see FIG. 6).

If the LB_CANCELR_B signal 101 is asserted, data cache 114 negates reservation bit 120. If a STWCX bus cycle has been issued on L-bus 94 by data cache 114 at that time, data cache 114 will abort the STWCX bus cycle and will assert the DC_RES_B signal 118. In one embodiment of the present invention, load/store logic 110 uses the DC_KILL_B signal 117 as a cycle termination signal in case of a STWCX bus STWCX bus cycle.

While the present invention has been illustrated and described with reference to specific embodiments, further modifications and improvements will occur to those skilled in the art. It is to be understood, therefore, that this invention is not limited to the particular forms illustrated and that it is intended in the appended claims to cover all modifications that do not depart from the spirit and scope of this invention.

We claim:

1. A data processing system, comprising:
    a first bus;
    a second bus;
    a first bus master, coupled to said first bus, said first bus master providing a first reserve signal and a first address to said first bus when said first bus master executes a first instruction;
    first reservation circuitry, coupled to said first bus and said second bus, said first reservation circuitry reserving a memory location corresponding to the first address in response to receiving the first reserve signal from said first bus, when said first bus master executes a second instruction, said first reservation circuitry provides a kill signal to said first bus in response to receiving a reservation inactive signal from said second bus;
    a second bus master, coupled to said first bus, said second bus master providing a second address to said first bus during a time when said second bus master has mastership of the first bus; and
    snoop circuitry, coupled to said first bus, said snoop circuitry storing the first address in response to receiving the first reserve signal from said first bus, said first bus master in response to receiving the second address from the first bus which matches the first address.

2. A data processing system as in claim 1, wherein said second bus master is a DMA (direct memory access) controller.

3. A data processing system as in claim 1, wherein said first bus master, said first reservation circuitry, said second bus master, and said snoop circuitry are located on a same integrated circuit.

4. A data processing system as in claim 1, wherein said first bus master and said first reservation circuitry are located on a same integrated circuit and said snoop circuitry is not located on the same integrated circuit.

5. A data processing system as in claim 1, wherein said first reservation circuitry is a portion of bus interface circuitry which is used to coupled the first and second busses.

6. A data processing system as in claim 1, further comprising:

second reservation circuitry, coupled to said second bus, said second reservation circuitry providing the reservation inactive signal to said second bus.

7. A data processing system as in claim 1, wherein said first bus master comprises:

a reservation storage circuit; and control circuitry, coupled to said reservation storage circuit, said control circuitry storing a first value in said reservation storage circuit when the said first bus master executes a first instruction, and said control circuitry storing a second value in said reservation storage circuit when said first bus master executes the second instruction.

8. A data processing system as in claim 7, wherein said control circuitry stores the second value in said reservation storage circuit when said first bus master receives the kill signal.

9. A data processing system as in claim 7, wherein the first value indicates that the memory location is reserved, and the second value indicates that the memory location is not reserved.

10. A data processing system as in claim 7, wherein the first instruction is a load instruction which performs a read bus cycle on said first bus, and the second instruction is a store instruction which performs a write bus cycle on said first bus.

11. A data processing system as in claim 10, wherein the first instruction has "lwarx" as its mnemonic, and the second instruction has "stwcx" as its mnemonic.

12. A data processing system as in claim 1, wherein said second bus master provides a second reserve signal and a third address to said first bus when said second bus master executes the first instruction, and wherein said snoop circuitry stores the third address in response to receiving the second reserve signal from said first bus, and wherein said snoop circuitry selectively provides a second cancel signal to said second bus master in response to receiving a fourth address from the first bus which matches the second address.

13. A data processor, comprising:

first bus;

a first bus master, coupled to said first bus, said first bus master providing a first reserve signal and a first address to said first bus when said first bus master executes a first instruction, said first bus master providing the first reserve signal and the first address to said first bus when said first bus master executes a second instruction;

a bus interface, coupled to said first bus, said bus interface driving a plurality of cycle type signals with a predetermined value during execution of the first and second instructions, said bus interface receiving a first cancel signal during execution of the second instruction if a reservation is not valid, in response to receiving the first cancel signal, said bus interface providing a kill reservation signal to said first bus master; and snoop circuitry, coupled to said first bus, said snoop circuitry storing the first address in response to receiving the first reserve signal from said first bus, said snoop circuitry providing a second cancel signal to said first bus master in response to receiving a second address from the first bus which matches the first address.

14. A data processing system as in claim 13, wherein said first bus master comprises:

a reservation storage circuit, said reservation storage circuit having a first value if the reservation is valid and having a second value if the reservation is not valid.

15. A data processing system as in claim 14, wherein the second value is stored in said reservation storage circuit when said first bus master receives the kill reservation signal.

16. A data processing system as in claim 13, wherein if said bus interface receives a retry signal during execution of the second instruction, then in response said bus interface determines if the first cancel signal has been received, and if the first cancel signal has been received, then said bus interface provides the kill reservation signal to said first bus master, and if the first cancel signal has not been received, then said bus interface retries execution of the second instruction.

17. A data processing system as in claim 13, further comprising:

a second bus master, coupled to said first bus, said second bus master providing a second reserve signal and a third address to said first bus when said second bus master executes the first instruction; and wherein snoop circuitry stores the third address in response to receiving the second reserve signal from said first bus.

18. A data processor, comprising:

a first bus;

a second bus;

a bus master, coupled to said first bus, said bus master providing a first reserve signal and a first address to said first bus when said bus master executes a first instruction, said bus master providing the first reserve signal and the first address to said first bus when said bus master executes a second instruction;

a first bus interface, coupled to said first bus, said first bus interface driving a plurality of cycle type signals with a predetermined value during execution of the first and second instructions, said first bus interface receiving a first cancel signal during execution of the second instruction if a reservation is not valid, in response to receiving the first cancel signal, said first bus interface providing a kill reservation signal to said bus master;

a second bus interface, coupled to said first and second busses, said second bus interface providing a second reserve signal during execution of the first and second instructions, said first bus interface receiving a second cancel signal during execution of the second instruction if the reservation is not valid, in response to receiving the second cancel signal, said second bus interface providing the kill reservation signal to said bus master; and snoop circuitry, coupled to said first bus, said snoop circuitry storing the first address in response to receiving the first reserve signal from said first bus, said snoop circuitry providing a third cancel signal to said first bus master in response to receiving a second address from the first bus which matches the first address.

19. A data processing system as in claim 18, wherein if said first bus interface receives a retry signal during execution of the second instruction, then in response said first bus interface determines if the first cancel signal has been received, and if the first cancel signal has been received, then said first bus interface provides the kill reservation signal to said first bus master, and if the first cancel signal has not been received, then said first bus interface retries execution of the second instruction.

20. A data processing system as in claim 18, wherein said bus master comprises:

an execution unit, having a first reservation storage circuit; and a data cache, coupled to said first bus and to said execution unit.

21. A data processing system as in claim 20, wherein said data cache comprises:

a second reservation storage circuit.

22. A data processing system, comprising:

a first bus;

a second bus;

a first bus master, coupled to said first bus, said first bus master providing a first reserve signal and a first address to said first bus when said first bus master executes a first instruction;

first reservation circuitry, coupled to said first bus and said second bus, said first reservation circuitry reserving a memory location corresponding to the first address in response to receiving the first reserve signal from said first bus, when said first bus master executes a second instruction, said first reservation circuitry provides a kill signal to said first bus in response to receiving a reservation inactive signal from said second bus;

a second bus master, coupled to said first bus, said second bus master providing a second reserve signal and a second address to said first bus when said second bus master executes the first instruction; and snoop circuitry, coupled to said first bus, said snoop circuitry storing the first address in response to receiving the first reserve signal from said first bus, said snoop circuitry storing the second address in response to receiving the second reserve signal from said first bus, said snoop circuitry selectively providing a first cancel signal to said first bus master in response to receiving a third address from the first bus which matches the first address, said snoop circuitry selectively providing a second cancel signal to said second bus master in response to receiving a fourth address from the first bus which matches the second address.

23. A data processing system as in claim 22, wherein said second bus master is a DMA (direct memory access) controller.

24. A data processing system as in claim 23, wherein said first bus master, said first reservation circuitry, said second bus master, and said snoop circuitry are located on a same integrated circuit.

25. A data processing system as in claim 22, further comprising second reservation circuitry coupled to said second bus.

26. A data processing system as in claim 25, further comprising:

second snoop circuitry coupled to said second bus.

27. A data processing system as in claim 22, wherein the first instruction is a load instruction which performs a read bus cycle on said bus.

28. A data processing system as in claim 22, wherein the first instruction has the mnemonic "LWARX".

29. A data processing system as in claim 22, wherein said first bus master comprises:

a reservation storage circuit; and control circuitry, coupled to said reservation storage circuit.

30. A data processing system as in claim 29, wherein said control circuitry stores a first value in said reservation storage circuit when a memory location corresponding to the first address is reserved, and said control circuitry stores a second value in said reservation storage circuit when the memory location corresponding to the first address is not reserved.

31. A data processing system as in claim 28, wherein said control circuitry stores the second value in said reservation storage circuit when said first bus master receives the at least one signal.

* * * * *

UNITED STATES PATENT AND TRADEMARK OFFICE
CERTIFICATE OF CORRECTION

PATENT NO. : 5,727,172

DATED : March 10, 1998

INVENTOR(S) : James B. Eifert et al

It is certified that error appears in the above-identified patent and that said Letters Patent is hereby corrected as shown below:

Column 16, line 54, after "from said first bus," insert - said snoop circuitry providing a first cancel signal to- . . .

Column 17, line 14, delete "the"

Column 17, line 15, delete "a", insert - the -

Column 17, line 45, insert - a - before "first bus"

Signed and Sealed this

Twenty-fourth Day of November,1998

Attest:

BRUCE LEHMAN

Attesting Officer

Commissioner of Patents and Trademarks